(12) United States Patent
Chen et al.

(10) Patent No.: US 11,927,848 B2
(45) Date of Patent: Mar. 12, 2024

(54) LIGHT SOURCE MODULE AND BACKLIGHT DISPLAY MODULE

(71) Applicant: FOSHAN NATIONSTAR OPTOELECTRONICS CO., LTD., Foshan (CN)

(72) Inventors: Weineng Chen, Foshan (CN); Danlei Gong, Foshan (CN); Hua Fan, Foshan (CN); Zhonghai Yan, Foshan (CN); Zihao Chen, Foshan (CN); Xiang Chen, Foshan (CN); Yushan Lin, Foshan (CN); Ke Yang, Foshan (CN); Fabo Liu, Foshan (CN)

(73) Assignee: FOSHAN NATIONSTAR OPTOELECTRONICS CO., LTD., Foshan (CN)

( * ) Notice: Subject to any disclaimer, the term of this patent is extended or adjusted under 35 U.S.C. 154(b) by 0 days.

(21) Appl. No.: 17/940,512

(22) Filed: Sep. 8, 2022

(65) Prior Publication Data
US 2023/0095880 A1    Mar. 30, 2023

(30) Foreign Application Priority Data

Sep. 24, 2021 (CN) .......................... 202111125443.X

(51) Int. Cl.
*G02F 1/13357* (2006.01)

(52) U.S. Cl.
CPC .. *G02F 1/133603* (2013.01); *G02F 1/133605* (2013.01)

(58) Field of Classification Search
CPC ................ G02F 1/133603; G02F 1/133605
See application file for complete search history.

(56) References Cited

U.S. PATENT DOCUMENTS

| 5,852,483 | A | * | 12/1998 | Newstead | ............ | G02B 6/0061 |
| | | | | | | 362/293 |
| 6,428,189 | B1 | * | 8/2002 | Hochstein | ............. | F21V 29/713 |
| | | | | | | 362/373 |
| 6,597,018 | B2 | * | 7/2003 | Nei | ........................ | H01L 33/54 |
| | | | | | | 257/E33.059 |

(Continued)

FOREIGN PATENT DOCUMENTS

| CN | 1795567 A | 6/2006 |
| CN | 103529596 A | 1/2014 |

(Continued)

OTHER PUBLICATIONS

Translation of OA1 of JP application, App. No. 2022-141664, dated Jul. 18, 2023, pp. 1-14.

*Primary Examiner* — Arman B Fallahkhair
(74) *Attorney, Agent, or Firm* — Stephen J. Weed; Culhane Meadows PLLC

(57) ABSTRACT

Provided are a light source module and a backlight display module. The light source module includes a flexible printed circuit board and a plurality of side-emitting LEDs. The flexible printed circuit board extends along a central axis. The plurality of side-emitting LEDs are sequentially arranged along the central axis and bonded to the flexible printed circuit board, and a light-emitting surface of one side-emitting LED of the plurality of side-emitting LEDs is perpendicular to a bonding surface of the flexible printed circuit board.

10 Claims, 3 Drawing Sheets

(56) References Cited

U.S. PATENT DOCUMENTS

| | | | |
|---|---|---|---|
| 7,714,954 B2 * | 5/2010 | Aoyagi | ............... H05K 1/0274 257/88 |
| 9,194,996 B2 | 11/2015 | Yu et al. | |
| 2020/0064533 A1 | 2/2020 | Miyazaki et al. | |
| 2023/0053397 A1 | 2/2023 | Park | |

FOREIGN PATENT DOCUMENTS

| | | |
|---|---|---|
| CN | 204887705 U | 12/2015 |
| CN | 108254972 A | 7/2018 |
| CN | 108319074 A | 7/2018 |
| CN | 110050227 A | 7/2019 |
| CN | 111602001 A | 8/2020 |
| CN | 211267258 U | 8/2020 |
| JP | 2006128415 A | 5/2006 |
| JP | 2008166010 A | 7/2008 |
| JP | 2009267279 A | 11/2009 |
| JP | 2013243042 A | 12/2013 |
| JP | 2017163029 A | 9/2017 |
| JP | 2018147879 A | 9/2018 |
| JP | 2021510446 A | 4/2021 |

* cited by examiner

LIGHT SOURCE MODULE AND BACKLIGHT DISPLAY MODULE

CROSS-REFERENCE TO RELATED APPLICATION(S)

This application claims priority to Chinese Patent Application No. 202111125443.X filed Sep. 24, 2021, the disclosure of which is incorporated herein by reference in its entirety.

TECHNICAL FIELD

The present disclosure relates to the field of display technology and, in particular to a light source module and a backlight display module.

BACKGROUND

With the economic development, consumers have increasingly higher requirements for displays. The bezel of the display gradually progresses from bulky and wide to lightweight and narrow. In a conventional curved display, since backlight bars adopt TOP light-emitting diodes (LEDs), a light bar circuit board needs to be manufactured in accordance with the projection curvature of the display, and for displays with different curvatures, light bar circuit boards with different curvatures are required to be designed. Thus, the backlight bars of the displays with different curvatures cannot be compatible, causing poor versatility of TOP LEDs.

SUMMARY

An object of the present disclosure is to overcome deficiencies in the related art. The present disclosure provides a light source module and a backlight display module. The light source module adopts a combination of a flexible printed circuit board and side-emitting LEDs. In this manner, displays with different curvatures can share the light source module of the same specification by using the elastic deformation of the flexible printed circuit board, improving the versatility of the light source module and saving costs.

To solve the preceding technical problems, an embodiment of the present disclosure provides a light source module. The light source module includes a flexible printed circuit board and a plurality of side-emitting LEDs.

The flexible printed circuit board extends along a central axis. The plurality of side-emitting LEDs are sequentially arranged along the central axis and bonded to the flexible printed circuit board. A light-emitting surface of one side-emitting LED of the plurality of side-emitting LEDs is perpendicular to a bonding surface of the flexible printed circuit board.

The flexible printed circuit board is provided with a windowing groove. One side-emitting LED of the plurality of side-emitting LEDs is located in the windowing groove.

The flexible printed circuit board includes an insulating layer, a copper layer, a solder-resist layer, and a bottom layer. The insulating layer is disposed on the bottom layer, the copper layer is disposed on the insulating layer, and the solder-resist layer is disposed on the copper layer.

One side-emitting LED of the plurality of side-emitting LEDs is provided with a plastic support and a metal pin embedded in the plastic support.

The plastic support is in contact with the insulating layer of the flexible printed circuit board. The metal pin is welded to the copper layer of the flexible printed circuit board through a solder paste.

The windowing groove includes a first windowing groove in which the plastic support is located and a second windowing groove in which the metal pin is located.

A contact surface between the plastic support and the first windowing groove is a first contact surface. A contact surface between the metal pin and the second windowing groove is a second contact surface.

A shape of the first windowing groove is formed by an outer periphery of the first contact surface by no more than 0.05 mm.

A shape of the second windowing groove is formed by an the outer periphery of the second contact surface by no more than 0.1 mm.

The light source module comprises a connector. The connector is disposed on the flexible printed circuit board. The connector is provided with at least two anode pins and at least two cathode pins. Anodes of the plurality of side-emitting LEDs are connected in parallel to the at least two anode pins of the connector. Cathodes of the plurality of side-emitting LEDs are connected in parallel to the at least two cathode pins of the connector.

The flexible printed circuit board is provided with a connection groove in which the connector is located.

One anode pin of the connector is electrically connected to anodes of at least two side-emitting LEDs. One cathode pin of the connector is electrically connected to cathodes of the at least two side-emitting LEDs.

Correspondingly, an embodiment of the present disclosure also provides a backlight display module. The backlight display module includes the preceding light source module, a reflective paper, a light guide plate, and an optical film group.

The reflective paper is disposed above the flexible printed circuit board.

The light guide plate is disposed above the reflective paper and on one side of light-emitting surfaces of the plurality of side-emitting LEDs.

The optical film group is disposed above the light guide plate.

The backlight display module further includes an outer frame, a back plate, a liquid crystal panel, and a thermally conductive double-sided adhesive. The thermally conductive double-sided adhesive is located at the bottom of the light source module and a position of the thermally conductive double-sided adhesive corresponds to the plurality of side-emitting LEDs. The liquid crystal panel is located above the optical film group. The outer frame and the back plate encapsulate the liquid crystal panel, the light source module, the reflective paper, the light guide plate, the optical film group, and the thermally conductive double-sided adhesive to form the backlight display module.

The back plate is a fully enclosed back plate or a back plate having a frame structure.

The present disclosure provides the light source module and the backlight display module. The flexible printed circuit board adopted by the light source module has an elastic deformation property so that the light source module can be applied to displays with different curvatures, improving the versatility of the product. The light source module adopts several side-emitting LEDs assembled on the flexible printed circuit board. Compared with an original light source module, the light source module of the present disclose has the advantages of large board width, large wiring width, and small line resistance so that complicated wirings can be designed on the flexible printed circuit board while the advantage of large board width is satisfied, thereby achieving the control of a single side-emitting LED. The light source module adopts several side-emitting LEDs assembled on the flexible printed circuit board, relaxing the restriction on the width of the backlight circuit board, improving the heat dissipation performance of the circuit board, and meanwhile, achieving the zone control of the side-emitting LEDs.

BRIEF DESCRIPTION OF DRAWINGS

To illustrate the schemes in embodiments of the present disclosure or the technical schemes in the related art more clearly, drawings used in the description of the embodiments or the related art will be briefly described below. Apparently, the drawings described hereinafter only illustrate part of the embodiments of the present disclosure. Those skilled in the art may obtain other drawings based on the contents and drawings described below on the premise that no creative work is done.

DETAILED DESCRIPTION

The schemes in embodiments of the present disclosure will be described clearly and completely in conjunction with the drawings in the embodiments of the present disclosure. Apparently, the embodiments described below are part, not all, of the embodiments of the present disclosure. Based on the embodiments of the present disclosure, all other embodiments obtained by those skilled in the art are within the scope of the present disclosure on the premise that no creative work is done.

Embodiment

Figure 1:
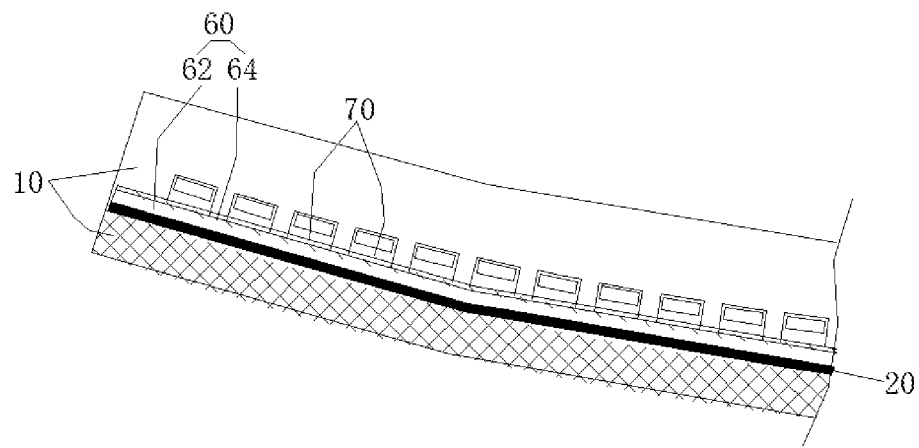
FIG. 1 is a structural diagram of a light source module according to an embodiment of the present disclosure.
Figure 2:
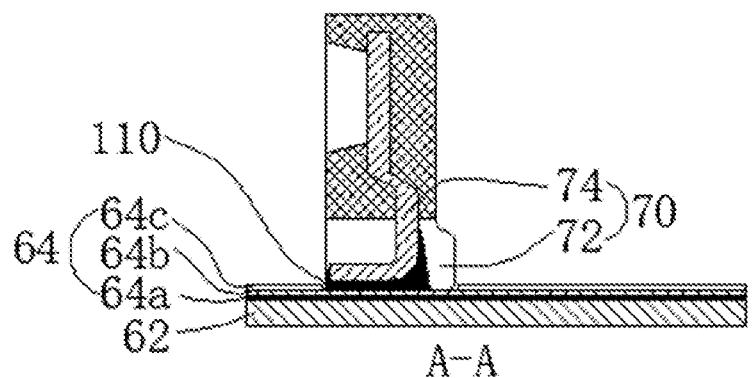
FIG. 2 is a structural diagram of a side-emitting LED according to an embodiment of the present disclosure.
Figure 3:
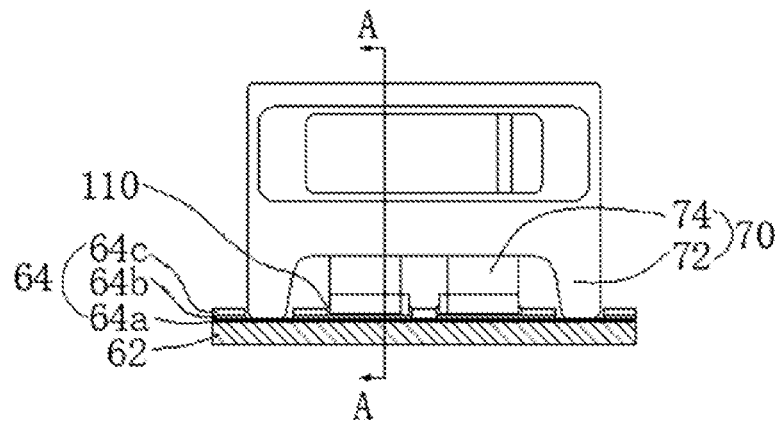
FIG. 3 is a sectional view of a side-emitting LED according to an embodiment of the present disclosure.

FIG. 1 is a structural diagram of a light source module according to an embodiment of the present disclosure. FIG. 2 is a structural diagram of a side-emitting LED according to an embodiment of the present disclosure. FIG. 3 is a sectional view of a side-emitting LED according to an embodiment of the present disclosure. The light source module provided by the embodiments of the present disclosure can be compatible with backlight display modules with different curvatures. The light source module includes a flexible printed circuit board 60 and several side-emitting LEDs 70. The flexible printed circuit board 60 extends along a central axis. The several side-emitting LEDs 70 are sequentially arranged along the central axis and bonded to the flexible printed circuit board 60. A light-emitting surface of any one side-emitting LED of the several side-emitting LEDs 70 is perpendicular to a bonding surface of the flexible printed circuit board 60. The several side-emitting LEDs 70 are arranged abreast on the flexible printed circuit board 60 and are located at one end of the flexible printed circuit board 60. The flexible printed circuit board 60 adopts a single-layer aluminum substrate having a good elastic deformation property so that back plates with different curvatures can share the light source module of the same specification, saving costs. Jumpers of crosslines on the single-layer aluminum substrate can be achieved through resistors of 0Ω.

The flexible printed circuit board 60 includes an insulating layer 64a, a copper layer 64b, a solder-resist layer 64c, and a bottom layer 62. The upper surface of the bottom layer 62 is connected to the bottom surface of the insulating layer 64a. The top surface of the insulating layer 64a is connected to the lower surface of the copper layer 64b. The upper surface of the copper layer 64b is connected to the solder-resist layer 64c. That is, the insulating layer 64a is disposed on the bottom layer 62. The copper layer 64b is disposed on the insulating layer 64a. The solder-resist layer 64c is disposed on the copper layer 64b. The solder-resist layer 64c, the insulating layer 64a, and the copper layer 64b are contact layers 64 between the several side-emitting LEDs 70 and the flexible printed circuit board 60. The bottom layer 62 may include a connected layer, a keep-out layer, and a visible grid layer. The keep-out layer is used for automatic wiring. The visible grid layer is for easy positioning when the designer is drawing.

Any one side-emitting LED 70 of the several side-emitting LEDs 70 is provided with a plastic support 72 and metal pins 74. The metal pins 74 are embedded in the plastic support 72.

Figure 4:
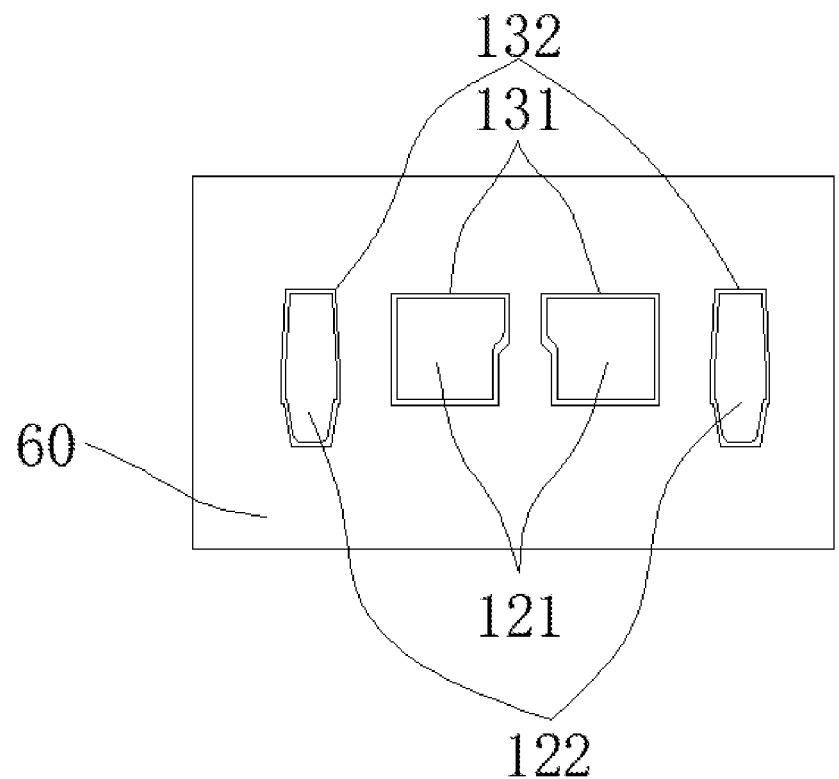
FIG. 4 is a structural diagram of windowing grooves according to an embodiment of the present disclosure.

FIG. 4 is a structural diagram of windowing grooves according to an embodiment of the present disclosure. The flexible printed circuit board 60 is provided with windowing grooves. Any one side-emitting LED of the several side-emitting LEDs 70 is located in windowing grooves. During the windowing process of the flexible printed circuit board, the solder-resist layer 64c is removed, and the copper layer 64b and the insulating layer 64a are exposed to form the windowing grooves for arranging the side-emitting LED 70. The windowing grooves are pits that can limit the movement of the side-emitting LED 70 and reduce the displacement rate of the side-emitting LED 70.

In an embodiment, the plastic support and the metal pins are located in the windowing grooves. The plastic support 72 is in contact with the insulating layer 64a of the flexible printed circuit board 60 through the windowing grooves. The metal pins 74 are welded to the copper layer 64b on the windowing grooves through a solder paste 110. The solder paste 110 secures the side-emitting LED 70 to the flexible printed circuit board 60. The metal pins 74 are disposed in the plastic support 72 so that the size of the side-emitting LED 70 and the thickness of the light source module can be reduced. It is to be noted that the window grooves include first window grooves 132 and second window grooves 131. The plastic support 72 is located in the first window grooves 132. The metal pins 74 are located in the second window grooves 131. The contact surface between the plastic support 72 and the first windowing groove 132 is a first contact surface 122. The contact surface between the metal pin 74 and the second windowing groove 131 is a second contact surface 121. The shape of the first windowing groove 132 is formed by increasing the outer periphery of the first contact surface 122 by no more than 0.05 mm. The shape of the second windowing groove 131 is formed by increasing the outer periphery of the second contact surface 121 by no more than 0.1 mm. The shape of the windowing groove is formed by increasing the periphery of the side-emitting LED 70 by no more than 0.05 mm so that the surface mount technology (SMT) displacement of the side-emitting LED 70 can be controlled within the range of ±0.05 mm, improving the precision. The side-emitting LEDs 70 can be accurately arranged on the flexible printed circuit board 60 through windowing, improving the lighting effect of the light source module.

Figure 5:
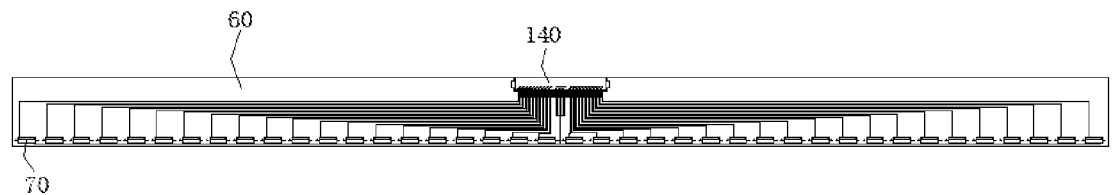
FIG. 5 is a structural diagram of a connector according to an embodiment of the present disclosure.

FIG. 5 is a structural diagram of a connector according to an embodiment of the present disclosure. The light source module is provided with a connector 140. The connector 140 is disposed on the flexible printed circuit board 60. The connector 140 is provided with several anode pins (i.e., more than one anode pin) and several cathode pins (i.e., more than one cathode pin). Anodes of the several side-emitting LEDs 70 are connected in parallel to the anode pins of the connector 140. Cathodes of the several side-emitting LEDs are connected in parallel to the cathode pins of the connector 140.

In an embodiment, the connector 140 is disposed in the light-emitting direction of the side-emitting LEDs 70. The flexible printed circuit board 60 is provided with a connection groove in which the connector 140 is located. Solder pins of the connector 140 are disposed on the surface of the copper layer of the flexible printed circuit board 60 and are connected to the flexible printed circuit board 60 through the solder paste. The rest of the connector 140 is embedded in the inside and the bottom of the flexible printed circuit board 60, reducing the shielding of light from the side-emitting LED 70 by the connector 140 while reducing the thickness of the light source module.

It is to be noted that the light source module has a thickness of less than 5.5 mm obtained by adding the protruding height of the connector 140, the thickness of the flexible printed circuit board 60, and the height of the side-emitting LEDs 70, reducing the thickness of the display.

It is to be noted that, one anode pin of the connector may be electrically connected to the anode of a respective one side-emitting LED or may be connected to anodes of more than two side-emitting LEDs. One cathode pin of the connector may be electrically connected to the cathode of a respective one side-emitting LED or may be connected to cathodes of more than two side-emitting LEDs. The connector may also be electrically connected to the cathodes of all of the side-emitting LEDs through one or two cathode pins.

During the specific implementation process, the wiring of the flexible printed circuit board is the wiring in which the several side-emitting LEDs 70 are electrically connected to the connector 40. The cathodes of the several side-emitting LEDs 70 are connected to the cathode pins of the connector 140. The anode of any one side-emitting LED 70 of the several side-emitting LEDs 70 may be connected in parallel to a corresponding anode pin of the connector 140 so that based on the connector 140, each side-emitting LED 70 can be independently controlled, and the local dimming (local light adjustment or local control) can be achieved through adjusting the circuit of each side-emitting LED 70.

It is to be noted that a master board control integrated circuit (IC) is connected to the connector 140 to control the side-emitting LEDs 70. Here, one or more connectors 140 may be provided. The number of connectors 140 is set according to the control requirements of the master board control IC. Moreover, the number of pins of the connector 140 can also be increased according to the circuit control requirements to granularly control the side-emitting LEDs 70.

In addition to achieving the independent control of the side-emitting LEDs 70, to reduce the costs, anodes of more than two side-emitting LEDs 70 of the several side-emitting LEDs 70 may be connected in parallel to a corresponding anode pin of the connector 140, thereby reducing the number of pins for the independent control to save the cost of the connector 140 and the cost of the master board control IC.

The light source module adopts the flexible printed circuit board 60 so that a light bar can be naturally bent based on the elastic deformation of the flexible printed circuit board. In this manner, displays of the same scale and different curvatures can share the light bar of the same type. The light source module can be applied to displays with various curvatures, improving the versatility. Moreover, windowing is performed on the flexible printed circuit board 60, improving the mounting accuracy of the side-emitting LEDs 70 and the compactness of the light source module.

The light source module adopts several side-emitting LEDs 70 to be assembled on the flexible printed circuit board. Compared with the original light source module, the light source module of the present disclose has the advantages of large board width, large wiring width, and small line resistance so that complicated wirings can be designed on the flexible printed circuit board while the advantage of large board width is satisfied, thereby achieving the control of a single side-emitting LED. The light source module adopts the several side-emitting LEDs assembled on the flexible printed circuit board, relaxing the restriction on the width of the backlight circuit board, improving the heat dissipation performance of the circuit board, and meanwhile, achieving the zone control of the side-emitting LEDs.

Figure 6:
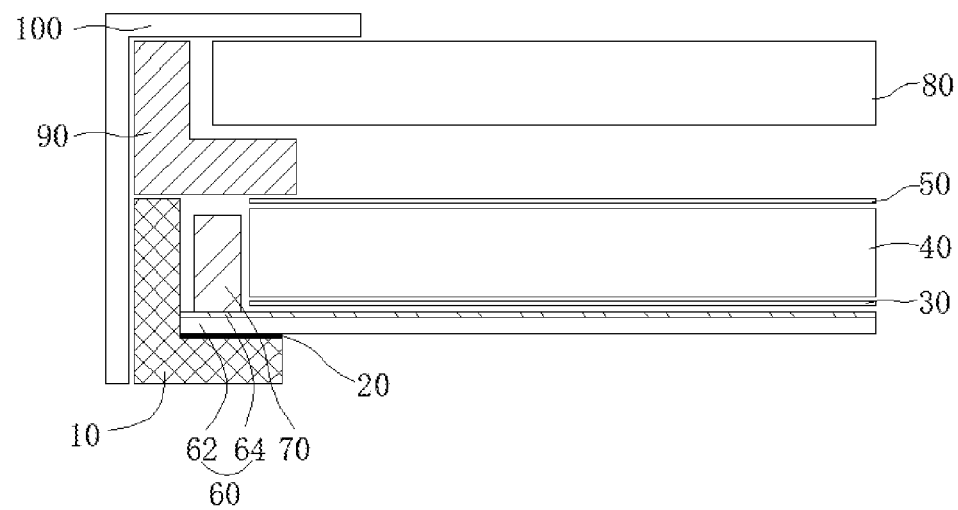
FIG. 6 is a partial structural diagram of a backlight display module according to an embodiment of the present disclosure.
Figure 7:
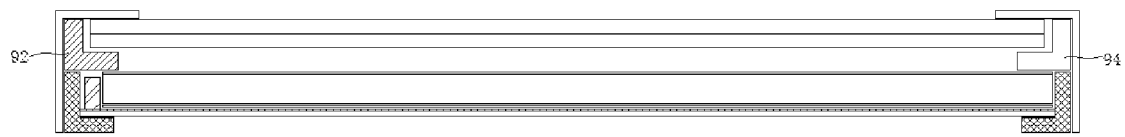
FIG. 7 is a sectional view of a backlight display module according to an embodiment of the present disclosure.

FIG. 6 is a partial structural diagram of a backlight display module according to an embodiment of the present disclosure. FIG. 7 is a sectional view of a backlight display module according to an embodiment of the present disclosure. The backlight display module involves in the present disclosure includes a light source module, a reflective paper 30, a light guide plate 40, an optical film group 50, and a liquid crystal panel 80. FIGS. 1 to 5 show the structural diagram of the light source module. The reflective paper is disposed above the flexible printed circuit board 60. The light guide plate 40 is disposed above the reflective paper 30 and on one side of light-emitting surfaces of the several side-emitting LEDs. The optical film group 50 is disposed above the light guide plate 40. The liquid crystal panel 80 is disposed above the optical film group. The reflective paper 30, the light guide plate 40, the optical film group 50, and the liquid crystal panel 80 are in parallel. The flexible printed circuit board 60 of the light source module and the light guide plate 40 are in parallel. Several side-emitting LEDs 70 are arranged abreast on one end of the flexible printed circuit board 60. That is, the several side-emitting LEDs 70 of the light source module are arranged at a side end of the light guide plate 40. The side-emitting LEDs 70 are arranged at a side end of the backlight display module group. Light emitted from the side-emitting LEDs 70 is uniformly scattered onto the liquid crystal panel 80 through the light guide plate 40 and the optical film group 50. The reflective paper 30 reflects the light emitted from the side-emitting LEDs 70 to increase the brightness of the side-emitting LEDs 70.

The backlight display module further includes a back plate 10, a support frame 90, and an outer frame 100. The back plate 10 is connected to one end of the outer frame 100. The support frame 90 is connected to the outer frame 100. The support frame 90 is disposed between the back plate 10 and the outer frame 100. The support frame 90 is secured to the outer frame 100 by screws, positions the liquid crystal panel 80, and meanwhile, supports the light guide plate 40 so that a certain light mixing distance is formed between the light guide plate 40 and the light-emitting surfaces of the side-emitting LEDs 70. The outer frame 100 and the back plate 10 encapsulate the liquid crystal panel 80, the light source module, the reflective paper 30, the light guide plate 40, and the optical film group 50 to form the backlight display module. The outer frame 100 has a buckle and is fixedly connected to the back plate 10 through the buckle to protect the structure of the module and improve the overall stability.

It is to be noted that the liquid crystal panel 80 is disposed between the outer frame 100 and the support frame 90. The light source module, the reflective paper 30, the light guide plate 40, and the optical film group 50 are disposed between the support frame 90 and the back plate 10. The flexible printed circuit board 60 of the light source module is locally coated with a thermally conductive double-sided adhesive 20 to be fixedly connected to the back plate 10. The back plate 10 may be a fully enclosed back plate or a back plate having a frame structure. When the back plate 10 is the fully enclosed back plate, heat generated by the side-emitting LEDs 70 requires to be transferred to the fully enclosed back plate through the flexible printed circuit board 60 and the thermally conductive double-sided adhesive 20 to be finally dissipated through the fully enclosed back plate.

The back plate 10 shown in FIGS. 6 and 7 is the back plate having a frame structure. The flexible printed circuit board 60 extends to the entire back of the backlight display module to replace the back plate for heat dissipation. To improve the heat dissipation capacity, the width of the flexible printed circuit board 60 may be correspondingly increased. Such a design prolongs the transfer path of the heat generated by the side-emitting LEDs 70. Formerly, it is needed to transfer the heat to the fully enclosed back plate through the thermally conductive double-sided adhesive which has a relatively low thermal conductivity coefficient and a relatively weak thermal conductivity. Currently, the heat is directly transferred to the flexible printed circuit board 60 and is dissipated through the entire flexible printed circuit board 60, improving the heat dissipation efficiency.

The support frame 90 includes a first support frame 92 and a second support frame 94. The first support frame 92 and the second support frame 94 position two ends of the liquid crystal panel 80.

The light source module of the backlight display module adopts the side-emitting LEDs 70 so that the backlight circuit board perpendicular to the display screen is changed to be parallel to the display screen, relaxing the restriction on the width of the backlight circuit board, improving the heat dissipation performance of the circuit board, and meanwhile, achieving more zone control of the side-emitting LEDs 70.

In addition, the above describes the embodiments of the present disclosure in detail. The principles and implementations of the present disclosure are described herein with specific examples. The preceding description of the embodiments is merely for assisting in understanding the method of the present disclosure and its core ideas. At the same time, for those of ordinary skill in the art, according to the idea of the present disclosure, there will be changes in specific implementations and applications. In summary, the content of this description should not be construed as limiting the disclosure.

What is claimed is:

1. A backlight display module, comprising: a light source module, a reflective paper, a light guide plate, and an optical film group, wherein the light source module comprises a flexible printed circuit board and a plurality of side-emitting light-emitting diodes (LEDs), wherein the flexible printed circuit board extends along a central axis, the plurality of side-emitting LEDs are sequentially arranged along the central axis and bonded to the flexible printed circuit board, and a light-emitting surface of one side-emitting LED of the plurality of side-emitting LEDs is perpendicular to a bonding surface of the flexible printed circuit board, wherein the bonding surface is a surface to which the plurality of side-emitting LEDs are bonded; and the flexible printed circuit board is provided with a windowing groove in which one side-emitting LED of the plurality of side-emitting LEDs is located;

the reflective paper is disposed above the flexible printed circuit board;

the light guide plate is disposed above the reflective paper and on one side of light-emitting surfaces of the plurality of side-emitting light-emitting diodes (LEDs); and the optical film group is disposed above the light guide plate;

wherein one side-emitting LED of the plurality of side-emitting LEDs is provided with a plastic support and a metal pin embedded in the plastic support; and wherein the windowing groove comprises a first windowing groove in which the plastic support is located and a second windowing groove in which the metal pin is located.

2. The backlight display module according to claim 1, further comprising: an outer frame, a back plate, a liquid crystal panel, and a thermally conductive double-sided adhesive, wherein the thermally conductive double-sided adhesive is located at a bottom of the light source module and a position of the thermally conductive double-sided adhesive corresponds to the plurality of side-emitting LEDs; the liquid crystal panel is located above the optical film group; and the outer frame and the back plate encapsulate the liquid crystal panel, the light source module, the reflective paper, the light guide plate, the optical film group, and the thermally conductive double-sided adhesive to form the backlight display module.

3. The backlight display module according to claim 2, wherein the back plate is a fully enclosed back plate or a back plate having a frame structure.

4. The backlight display module according to claim 1, wherein the flexible printed circuit board comprises an insulating layer, a copper layer, a solder-resist layer, and a bottom layer, wherein the insulating layer is disposed on the bottom layer, the copper layer is disposed on the insulating layer, and the solder-resist layer is disposed on the copper layer.

5. The backlight display module according to claim 4, wherein the plastic support is in contact with the insulating layer of the flexible printed circuit board, and the metal pin is welded to the copper layer of the flexible printed circuit board through a solder paste.

6. The backlight display module according to claim 1, wherein a contact surface between the plastic support and the first windowing groove is a first contact surface, and a contact surface between the metal pin and the second windowing groove is a second contact surface;

a shape of the first windowing groove is formed by increasing an outer periphery of the first contact surface by no more than 0.05 mm; and a shape of the second windowing groove is formed by increasing an outer periphery of the second contact surface by no more than 0.1 mm.

7. A light source module, comprising: a flexible printed circuit board and a plurality of side-emitting light-emitting diodes (LEDs), wherein
the flexible printed circuit board extends along a central axis, the plurality of side-emitting LEDs are sequentially arranged along the central axis and bonded to the flexible printed circuit board, and a light-emitting surface of one side-emitting LED of the plurality of side-emitting LEDs is perpendicular to a bonding surface of the flexible printed circuit boards, wherein the bonding surface is a surface to which the plurality of side-emitting LEDs are bonded; and
the flexible printed circuit board is provided with a windowing groove in which one side- emitting LED of the plurality of side-emitting LEDs is located;
wherein one side-emitting LED of the plurality of side-emitting LEDs is provided with a plastic support and a metal pin embedded in the plastic support; and
wherein the windowing groove comprises a first windowing groove in which the plastic support is located and a second windowing groove in which the metal pin is located.

8. The light source module according to claim 7, wherein the flexible printed circuit board comprises an insulating layer, a copper layer, a solder-resist layer, and a bottom layer, wherein the insulating layer is disposed on the bottom layer, the copper layer is disposed on the insulating layer, and the solder-resist layer is disposed on the copper layer.

9. The light source module according to claim 8, wherein the plastic support is in contact with the insulating layer of the flexible printed circuit board, and the metal pin is welded to the copper layer of the flexible printed circuit board through a solder paste.

10. The light source module according to claim 7, wherein a contact surface between the plastic support and the first windowing groove is a first contact surface, and a contact surface between the metal pin and the second windowing groove is a second contact surface;
a shape of the first windowing groove is formed by increasing an outer periphery of the first contact surface by no more than 0.05 mm; and
a shape of the second windowing groove is formed by increasing an outer periphery of the second contact surface by no more than 0.1 mm.

* * * * *